April 21, 1964  C. F. CALA  3,130,029
METHOD FOR MAKING FUSED MULTIFOCAL LENSES
Filed June 23, 1959  4 Sheets—Sheet 1
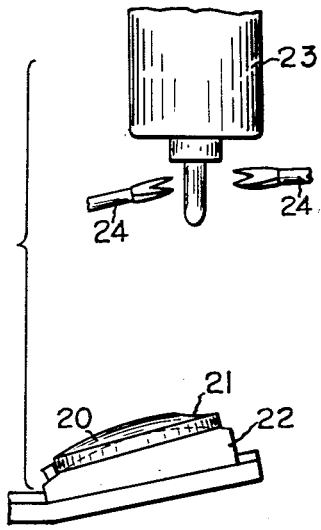
FIG. 1
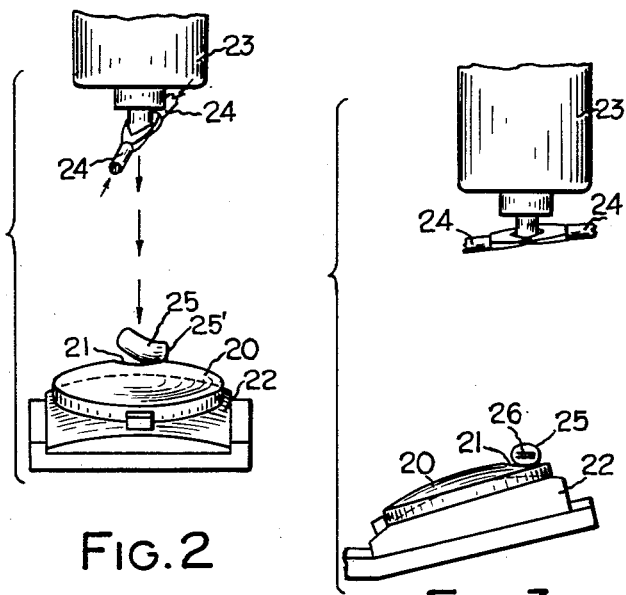
FIG. 2
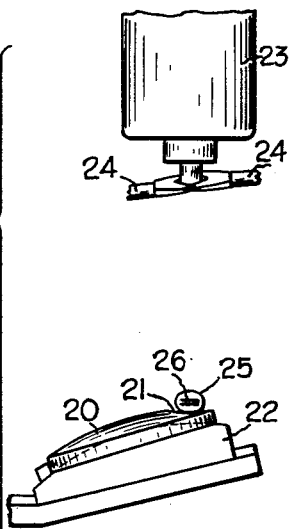
FIG. 3
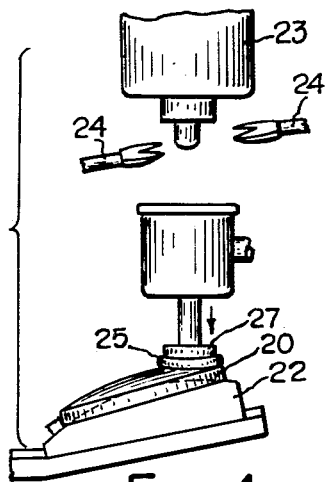
FIG. 4
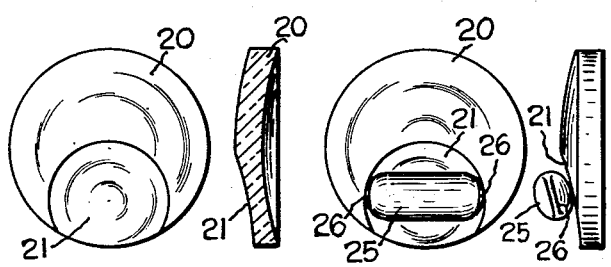
FIG. 5  FIG. 6  FIG. 7  FIG. 8
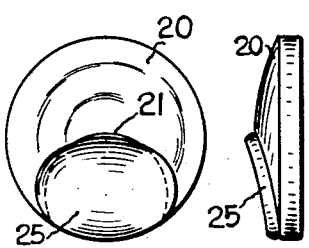
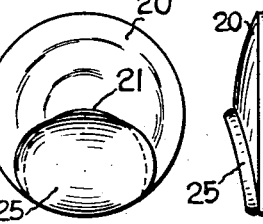
FIG. 9  FIG. 10
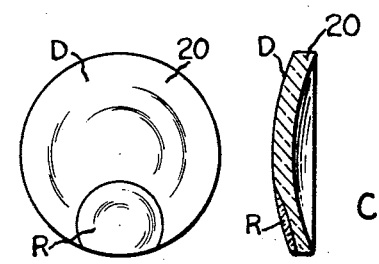
FIG. 11  FIG. 12
INVENTOR.
CHARLES F. CALA
BY M. A. Ellestad
ATTORNEY April 21, 1964  C. F. CALA  3,130,029
METHOD FOR MAKING FUSED MULTIFOCAL LENSES
Filed June 23, 1959  4 Sheets-Sheet 2

INVENTOR.
CHARLES F. CALA
BY
Eyre, Mann & Lucas
ATTORNEYS

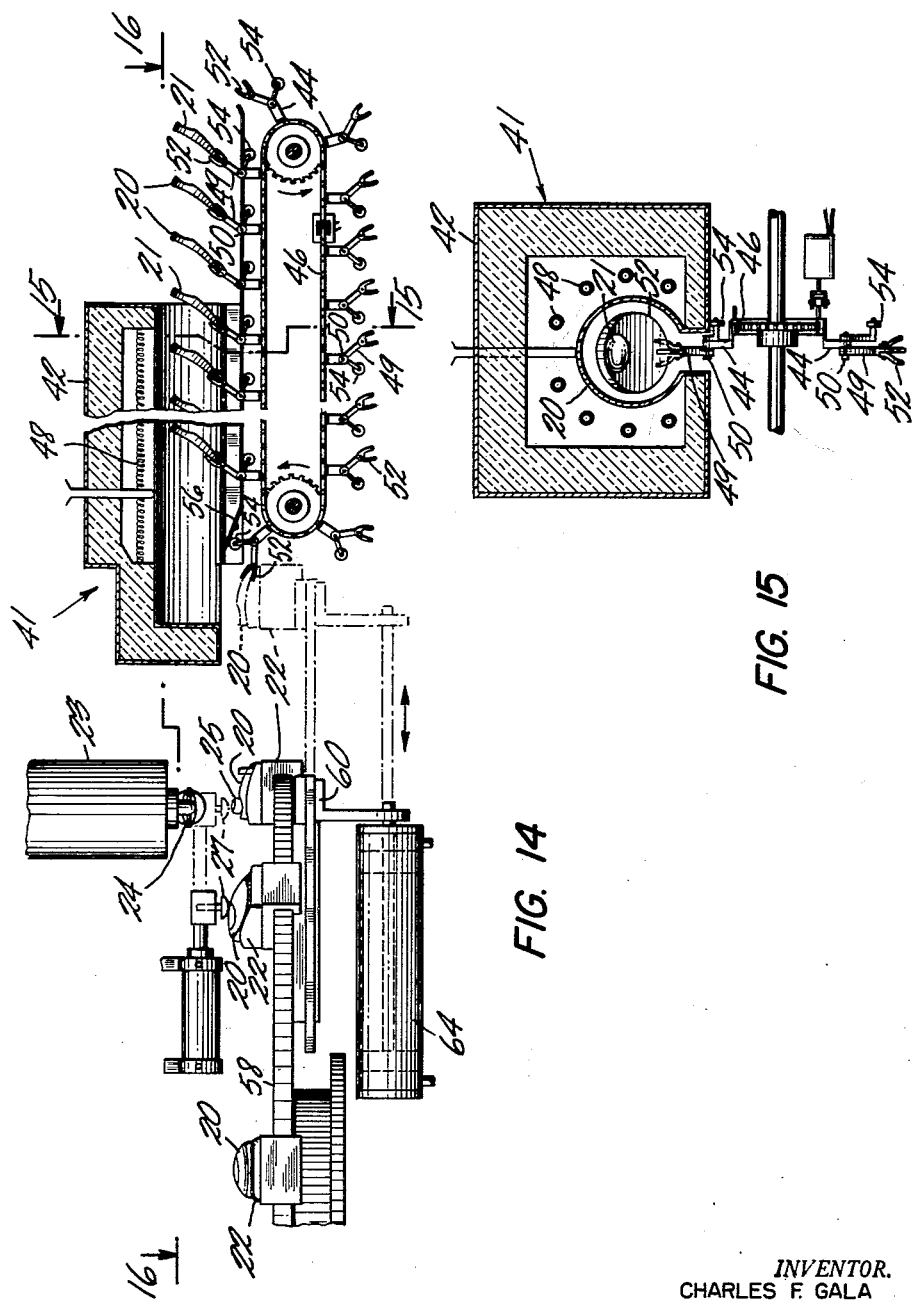

April 21, 1964     C. F. CALA     3,130,029
METHOD FOR MAKING FUSED MULTIFOCAL LENSES
Filed June 23, 1959     4 Sheets-Sheet 4

INVENTOR.
CHARLES F. CALA
BY
ATTORNEYS

United States Patent Office
3,130,029
Patented Apr. 21, 1964

3,130,029
METHOD FOR MAKING FUSED MULTIFOCAL LENSES
Charles F. Cala, Irondequoit, N.Y., assignor to Bausch & Lomb Incorporated, a corporation of New York
Filed June 23, 1959, Ser. No. 822,364
12 Claims. (Cl. 65—39)

The present invention relates to the manufacture of multifocal lens blanks which are formed by depositing molten segment glass on a polished depression or countersink surface in a blank of glass held on a support whereby the two glasses are caused to fuse together.

Heretofore many suggestions have been made concerning the manufacture of multifocal lens blanks by depositing molten segment glass on the polished countersink surface of a lens blank but none of these have proved to be of practical commercial value because of the problem with distortion to vision that appears in the finished lens. As a result the commercial processes in use today still involve the fusion of two solid pieces of glass just as it has for the past fifty years.

In accordance with the present invention this problem of control of distortion of the glass blanks has been overcome and there has now been developed a process for the manufacture of multifocal lens blanks which in pilot plant operations has successfully produced semi-finished lens blanks of commercial quality.

In carrying out the process of the present invention it was found virtually impossible to produce a multifocal lens free of distortion when the molten segment glass was prepared in ordinary manner. Upon investigation it turned out quite unexpectedly that the molten segment glass was not of uniform composition and there were very small differences in the composition of the mass of the glass which caused striae to appear in the final product that distorted vision and resulted in a high percent of rejects. It was also discovered that the molten glass contained small bubbles of reaction gas which remained in the glass to cause distortion in the finished product.

This problem of distortion caused by the physical characteristics of the molten glass was solved by subjecting the molten glass to a fining and mixing operation which removed the gas bubbles formed during reaction and provided a homogeneous mass of molten glass of uniform composition. After the degassing and mixing operations the molten segment glass is gravity extruded from a tank and deposited on the countersink surface of a glass blank.

While the fining and mixing operation greatly reduced the number of rejects we still experienced distortion in the finished lens. Investigation showed that this distortion was the result of one or two factors.

First of all it was found that when the temperature of the molten segment glass was too low distortion lines appeared at the interface and the piece had to be rejected. In accordance with our observations these distortion lines appeared when the blank chilled the molten glass to the point that its flow was so uneven that chill marks formed as the molten glass flowed out over the surface of the polished countersink.

On the other hand it was found that if the heat of the molten segment glass which causes fusion was allowed to accumulate at the polished countersink surface and remain there for any appreciable period of time distortion occurred because of the heat and the piece had to be rejected.

In the present process this problem of distortion is solved by providing the molten segment glass with a cool viscous exterior surface coating which inhibits flow of the molten core and tends to preserve the extruded shape of the glass. At high viscosity the shell of the molten glass is at low temperature as compared to the high temperature of the molten free flowing core and when the molten segment glass is applied to the countersink surface the low temperature of the shell initially protects the polished countersink surface from the heat of the core.

Before the heat of the core is able to penetrate through to the polished surface of the countersink and cause distortion thereof positive pressure is applied to the molten segment glass to cause it rapidly to flow out at an even rate of speed to form a thin laminate of large surface area that covers the surface of the polished countersink. By pressing the molten segment glass out in this way the heat of the core is distributed throughout the laminate to cause fusion but the heat is thereafter rapidly given up to the atmosphere and because of the large surface area of the laminate of glass the heat is dissipated before any appreciable distortion to vision can occur.

No difficulties have been experienced with chill marks when the segment glass is caused to flow out over the countersink by means of positive pressure.

Certain conditions must be observed in fusing the molten segment glass to the countersink surface.

First of all the temperature of the molten segment glass must be so controlled that the extruded form will be self-sustaining. In the preferred form of this invention the molten segment glass is extruded in a stream in the form of a cylinder from which appropriate lengths or gobs are cut off and deposited on a portion of the countersink surface. The gob of molten segment glass is defined as self-sustaining in that the viscous exterior surface coating so inhibits flow of the molten core that the glass is incapable of flowing out to cover the entire countersink area of its own accord without application of positive pressure. While the gob may flatten out somewhat under its own weight as shown in the drawings, it is incapable of flowing out to cover the entire countersink area of its own accord without application of positive pressure. As is known any small change in composition of a particular type of glass will materially effect viscosity so that as a practical matter it is extremely difficult to specify a range of viscosity for the shell which would be applicable to all of the different types of molten segment glass employed in the manufacture of multifocal lenses. In our pilot plant work excellent control has been achieved as a practical matter by adjusting the amount of heat supplied to the gravity extrusion feeder tank to provide the extruded molten segment glass with a viscous outer shell that is sufficiently cool to prevent the glass from flowing out to cover the countersink area of the blank without application of positive pressure. Control of heat to provide a surface skin of the required viscosity is best achieved by observation. In general, however, we have achieved satisfactory results for a gob with the mass in the neighborhood of about ten grams by maintaining the logarithmic viscosity of the surface of the extruded segment glass between about 2.75 to 6.0 poises at the time the glass is deposited on the surface of the countersink. Within the range specified only minor changes may be required in order to deposit the glass on the countersink in a self-sustaining form. Best results have been achieved by maintaining the viscosity between about 3.0 to 5.5 poises. The viscosity ranges specified have application to barium crown segment glass, dense flint segment glass, extra dense flint segment glass and barium flint segment glass but it will be understood that any type of glass customarily employed in the manufacture of multifocal lenses may be employed in the present process and the specified types of glass are merely given for the purpose of illustration. It is to be noted that the viscosity of the surface skin of the gob may be increased above the values specified to provide a tougher surface skin but no particular advantage is achieved thereby. The specified viscosities were determined in conventional manner for glass.

More advantages, in addition to those already mentioned are realized in carrying out the present process. Since positive pressure is employed to spread out and mold the self-sustaining gob of segment glass to the shape of the countersink surface the amount of segment glass used for covering the countersink may be much less than that required when the segment glass is in a free flowing form. In pilot plant operation the amount of free flowing glass required to cover the countersink surface was about twice to three or even four times the amount of glass used in the self-sustaining gob of the present invention. For example in accordance with the present invention about 9 to 15 grams of glass are used in the self-sustaining gob whereas it requires about 30 to 40 or more grams of glass in the form of a free flowing gob to cover the same size countersink surface. The large excess of glass required in the free flowing mass is probably due to the difficulty of causing the glass to cover and fuse to the peripheral edge of the countersink surface where the angle between the polished surface of the countersink and unpolished surface of the blank is quite sharp so that the glass tends to bridge across the edge. There is no problem of the glass bridging across when the positive pressure of the present invention is employed for molding the segment glass to the countersink surface. Reduction in the amount of segment glass required for covering the countersink surface materially reduces the cost of grinding and polishing the final product and of course provides a saving in the amount of glass used.

Another advantage of the present process is that the self-sustaining gob of segment glass makes it possible to control handling of the glass so that the gob may be deposited on the countersink surface in predetermined manner. As a result, in our pilot plant operation a gob of desired length of the extruded segment glass is cut off and the gob of glass is allowed to fall freely through space before it hits the countersink surface. The free falling gob picks up momentum in falling through space and it has been found that this momentum enables the viscous relatively cool skin of the gob to contact the surface of the blank so quickly that there is no tendency to form chill marks or folds in the glass which cause visible distortion as in the case when the segment glass makes gradual contact at an uneven rate of speed. In falling through space the gob tends to assume a somewhat tear drop shape with the mass concentrated in the base and this concentration of mass further stimulates fast even speed of contact with the countersink surface.

Best results are achieved by controlling the cutting to cause the cylindrical length or gob of glass to tilt so that the longitudinal axis through the cylindrical length will be at an angle other than 90 or 180° to a horizontal plane through the point of first contact on the countersink surface. Tilting the cylindrical length or gob of segment glass in this way further increases the speed of contact and it insures progressive continuous contact along the length of the gob. Otherwise if the longitudinal axis through the cylindrical length of segment glass were to be initially positioned horizontally across the countersink surface there is the chance of trapping air or folds may form in the segment glass both of which may result in visible distortion in the final product.

If the shears employed for cutting off a length of the extruded stream of glass are cold they leave fracture marks where the glass is severed and if these fracture marks are positioned against the surface of the countersink surface visible distortion will result. Since the gob of the present invention is caused to fall on its side against the countersink surface the top and bottom of the cylinder are exposed to air. Since the fracture marks do not contact the countersink they will be ground away in the finishing process. Alternately the cut end of the cylinder may be deposited in an area just outside but adjacent to the countersink surface so that the fracture marks of the shears will be positioned beyond the periphery of the countersink.

In carrying out the present invention best results are achieved with a free falling cylindrical gob of segment glass the side of which contacts the blank with the longitudinal axis of the cylindrical gob positioned at an acute angle to a horizontal plane through the point of contact. The gob is deposited on only a portion of the countersink surface and the self-sustaining gob requires the application of positive pressure to mold it to the countersink surface so that a relatively thin laminate of large surface area is formed for dissipation of the heat of the core. It will be understood, however, that many advantages of the present invention will be realized even though the self-sustaining gob of segment glass is large enough to completely cover the countersink area at the time of application and the same is true even though the extruded stream of self-sustaining form contacts the countersink surface before the stream is severed by the shears.

Positive pressure for molding the self-sustaining gob of segment glass to the countersink surface may be applied by any convenient means but best results have been achieved with a metal plunger having a convex spherical face which matches the curvature of the polished countersink surface. The metal plunger may be heated to cut down the chill on the molten segment glass. In those cases where operating temperatures are high a cooling fluid may be applied to or circulated through the plunger to assist in dissipating the heat of the molten segment glass. Whether the plunger is heated or not will be determined by the exact conditions chosen for operation. The plunger may be made of material other than metal and any suitable refractory material may be employed.

As to the glass blank, the composition of the glass of the blank is that customarily used in the manufacture of multifocal lenses such as ordinary crown or crown flint glass.

The blank is molded in conventional manner and then it is ground and polished to provide the countersink surface. The blank is preheated before application of the segment glass in order to avoid thermal shock and resulting fracture of the blank. In general if the temperature of the blank is above 500° F. and preferably about 950° F. there is no danger of thermal shock.

In our pilot plant operations it was found that surprisingly excellent results are achieved by very quickly heating the blank to provide it with a hot surface skin. When this is done the heat of the surface skin further eliminates the tendency for chill marks to form when the self-sustaining gob of segment glass is molded under positive pressure to conform to the countersink surfaces. Another advantage of the hot surface skin is that the relatively cool rigid interior core of the blank readily absorbs heat from the surface of the blank to eliminate any tendency for the polished countersink to distort because of the heat of the molten core of the self-sustaining gob of segment glass. The interior core of the blank is maintained at a temperature high enough to avoid thermal shock from the heat of the segment glass.

Control of heat treatment of the blank presents no problem it being only necessary to heat the blank at an ambient temperature substantially above the softening point of the glass for such a short period of time as to provide a hot surface skin with interior core below the softening point of the glass but above the temperature at which thermal shock would occur. For example with the ordinary types of crown or crown flint glass now in conventional use in the major blank of bifocal lenses the softening point of the glass will occur within a temperature range of about 1060 to 1480° F. and for these glasses we have achieved satisfactory results by heating the blanks which are at room temperature throughout for such a short period of time as from 2 to 5 minutes in an oven with ambient temperature of from 1500° F. to 1900° F. As a result of such heat treatment a temperature gradient is established through the blanks so that the cool interior core is at least about 50° C. cooler than the hot surface skin of the blank. This was established by calculations based on our pilot plant operations. The exact heat treatment to employ is difficult to specify because of the many parameters involved in the fusion process but once the principle of providing the blank with hot surface skin and rigid cool interior core is understood it is extremely simple as a practical matter to conduct a few trial runs in order to establish the heat treatment required for the particular process and equipment at hand. In our work excellent results have been consistently achieved by applying the self-sustaining gob of molten segment glass to blanks having a surface skin at a temperature at least as high as that of the softening point of the glass with rigid interior core at a temperature below the softening point but above that temperature at which thermal shock and resulting fracture would occur. As is known the softening point of glass is defined as that temperature at which the glass will begin to deform under its own weight as determined by standard tests well known in the art.

After the self-sustaining gob of molten segment glass is applied to the countersink surface the temperature of the surface skin of the blank reaches and goes beyond that temperature at which fusion occurs but this is tolerated without distortion since the skin is reinforced by the rigid cool interior core of the blank and such high temperature is not maintained for any extended period of time because the cool interior core of the blank constantly draws heat away from the surface. Accordingly the surface skin of the blank may reach a temperature above that of the fusion point of the blank during heat treatment but best results are achieved as a practical matter if the temperaure of the skin of the blank is below that of fusion point just prior to the time the molten segment glass is applied to the polished countersink of the blank.

The mass of glass in the interior core of the blank which is held below the softening point of the glass should be about equal to the mass of the self-sustaining gob of molten segment glass that is applied to the countersink and the mass of the core is preferably greater than that of the molten segment glass. On the other hand satisfactory results may be achieved when the mass of the cool interior core of the blank is less than that of the self-sustaining gob of molten segment glass.

Many advantages accrue from heating just the surface skin of the blank above the softening point and among these one important advantage is that the rigid core of the blank provides a very solid support for the surface skin so that even though the skin is above softening point no apparent visible distortion takes place which would otherwise tend to occur if the entire body of the blank was at a temperature above the softening point. Another outstanding advantage of the rigid core of the blank is that the blank may be supported and handled in any convenient manner during heat treatment without danger of distortion. There is no need to provide a support with curved surface that exactly corresponds to the curvature of the blank since the rigid core of the blank prevents it from sagging to conform to the curvature of the support block.

In accordance with the present invention the blank is preferably supported at its edge in upright position by means of a metal clip during heat treatment and then the blank is positioned face down on a refractory block while the segment glass is deposited on the polished countersink. Supporting the blank at its edge in upright position eliminates the use of refractory support blocks in the furnace which only tend to liberate dirt particles that frequently appear at the interface between the segment glass and blank.

Additional details and advantages of a preferred form of the present invention may be readily understood by reference to the drawings which illustrate one form of apparatus employed in carrying out the invention and in which FIGS. 1 through 4 are schematic views illustrating successive steps in the manufacture of fused multifocal lenses in accordance with the present invention.

FIG. 5 is a front elevation view of a major blank of glass used in the manufacture of fused multifocal lenses.

FIG. 6 is a vertical sectional view of the blank of glass of FIG. 5.

FIG. 7 is a front elevational view showing the blank just after the segment glass has been deposited thereon but before the segment glass has been subjected to positive pressure.

FIG. 8 is a side view of the assembly of FIG. 7.

FIG. 9 is a front elevational view showing the completed lens blank.

FIG. 10 is a side view of the structure of FIG. 9.

FIG. 11 is a front view of a finished multifocal lens which has been produced by grinding and polishing the lens blank shown in FIGS. 9 and 10.

FIG. 12 is a vertical sectional view of the structure of FIG. 11.

FIG. 14 is a side view of one form of apparatus which may be employed for heating the lens blanks prior to depositing the segment glass thereon. This figure is partly in section to better illustrate construction of the parts.

FIG. 15 is a cross sectional view taken on line 15—15 of FIG. 14.

Figure 13:
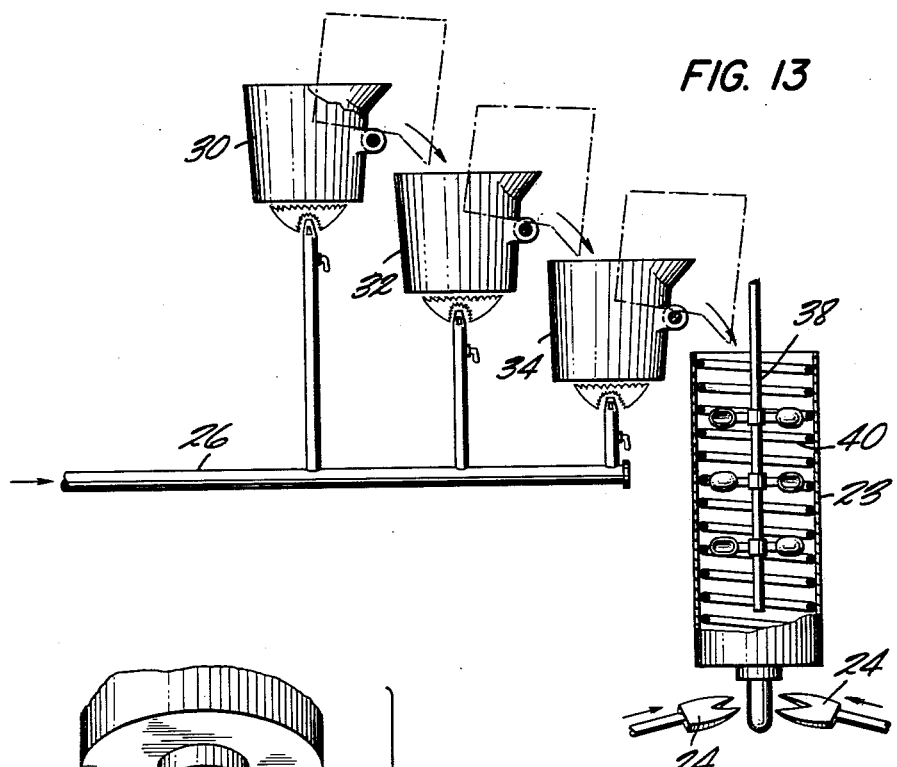
FIG. 13 illustrates one form of apparatus for processing the segment glass before it is extruded from the feeder.

In carrying out the present invention a major blank 20 of spectacle crown glass is provided on its upper side with a polished concavity or countersink 21 which may be formed in any suitable manner. The blank is preferably molded without countersink and then after the glass is completely solidified and cooled the blank is turned out out of the mold, the countersink is ground into the surface of the blank and then polished. Alternatively, the countersink may be molded into the blank and then after the glass is completely solidified and cooled the blank may be turned out of the mold and if necessary the countersink surface polished.

The blank 20 preferably with its entire body at room temperature is rapidly heated in a suitable furnace (later described) to provide the blank with hot surface skin and relatively cool interior core with the temperature of the interior core at or above the temperature of thermal shock but below softening point.

The blank with its countersink surface 21 uppermost is then placed on a preheated refractory block 22 (later described) under the orifice of the segment glass gravity extrusion feeder tank 23 as illustrated in FIG. 1. A self-sustaining gob of segment glass is cut from the extruded stream by the shear members 24 and allowed to fall freely through air onto the polished countersink surface. The gob is self-sustaining and incapable of flowing out to cover the entire countersink area without application of positive pressure.

By the non-symmetrical or eccentric operation of shear members 24 the sheared gob 25 of glass is caused to twist or turn in its descent so that the side of the cylindrical gob at one end 25' first strikes the countersink surface at the periphery thereof. The remainder of gob 25 then falls lengthwise against the countersink surface 21 in such a manner that successive portions of the undersurface of the gob 25 contact the surface of the countersink (FIG. 2) to thereby prevent entrapment of air bubbles at the fused interface. Since the gob is tilted so that the cylindrical wall makes contact with the countersink surface shear marks which appear on the top surface and bottom surface 25' of the cylinder do not contact the countersink surface. Positive pressure is then applied to the self-sustaining gob by means of a metal plunger 27 (later described).

Figure 17:
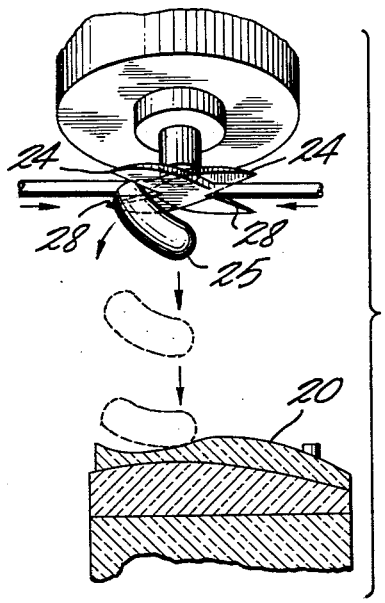
FIGS. 17 and 18 illustrate manipulation of the shears so that the self-sustaining gob of glass is tilted as it is cut from the stream of glass extruded from the feeder.
Figure 18:
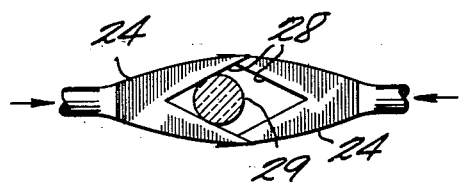

The way in which the shear members 24 are operated in order to cause the gob of glass to tilt and turn during its descent is illustrated in FIGS. 17 and 18. As there shown the shear members 24 are positioned one below the other as in a pair of conventional household shears.

As best shown in FIG. 18 the cooperating forked cutting edges 28 of the shear members form a triangular hole 29 and the shear members are so arranged that the extruded stream of glass is positioned off center at one side of the hole so that the shear member moving in from the left in FIG. 18 will make first contact with the stream of glass. This shear member does most of the cutting. The shear member moving in from the right (FIG. 18) makes contact last but it cuts into the glass before the gob is severed and in moving in from the right this shear member pushes the top of the gob over to the left so that the gob will turn in its descent and be deposited on the polished countersink surface as illustrated in FIG. 2 of the drawing.

As best shown in FIG. 2 of the drawing, the mass of each individual gob of glass is less than one-half of the mass of the blank and preferably the mass of the gob of glass is not more than one-third of the mass of the blank. The viscous shell on the gob preserves the extruded shape and makes it self-sustaining so that the gob may be tipped over and applied to the countersink surface under controlled conditions without having the glass flow out over the surface of the blank beyond the confines of the polished countersink area.

In the preferred form of the invention shown in the figures the molten gob is deposited on only a portion of the countersink surface and if left alone without application of positive pressure the self-sustaining gob would not spread out to cover the entire area of the countersink. However, immediately after the gob is in place on the countersink surface the metal plunger 27 is moved into position over the gob and pressed down to flatten the gob out and spread it over the area of the countersink surface 21 as illustrated in FIGS. 4, 9 and 10.

By spreading the gob out into a relatively thin laminate of large surface area the heat of the core is distributed throughout the laminate to cause fusion and the heat is rapidly dissipated into the atmosphere by the large surface area of the laminate before the temperature of the countersink surface is raised to the point where any visible distortion can occur. That portion of the heat of the core which penetrates down into the surface of the blank is readily absorbed from the surface by the core of the blank which is at a temperature below the softening point of the glass and preferably at a temperature just above that at which thermal shock would occur.

In some applications where operating temperatures are high the use of the metal plunger 27 is of decided advantage in that the metal has high heat conductivity which assists in dissipating the heat of the molten core of the gob. But, it is not necessary to use a metal plunger of high heat conductivity especially when operating at low temperatures since dissipation of heat resulting from the large surface area of the disc is sufficiently rapid to prevent distortion of the polished countersink surface. For example we have achieved satisfactory results with a plunger made of a suitable refractory material having relatively low heat conductivity.

After the gob 25 is fused to blank 20 the composite blank is annealed in the usual manner and then ground and polished to provide the finished lens shown in FIGS. 11 and 12 wherein distant vision is provided by the major area D of blank 20 while reading or near vision is provided by the field R which is formed by the segment glass of gob 25 having a higher refractive index than the major blank.

FIG. 13 illustrates one suitable form of apparatus for processing the molten segment glass to achieve glass of uniform composition free of reaction gas bubbles. As there shown 30, 32 and 34 are crucibles in which the segment glass is formed and subjected to the fining operation. The crucibles may be made of a suitable refractory material preferably one that has high resistance to the glass forming ingredients so that the refractory material will not dissolve. Best results are achieved with platinum crucibles. The raw materials are mixed and added to crucible 30 which is heated by any suitable means such as by the gas burner shown at 26 to cause reaction and form the molten glass. The temperature employed is that customarily used in the art and in general the temperature in this crucible will be in the neighborhood of 2200° F. to 2600° F. Gas bubbles form during reaction and as previously described it is important to remove these bubbles which will otherwise distort vision in the lens blank. The gas bubbles may be liberated from the mass of molten glass by subjecting them to gentle agitation and increasing the temperature about 100 to 200° F. above reaction temperature will speed up the release of gas bubbles from the mass. In the apparatus shown the molten glass is poured in a thin stream over the edge of the plurality of crucibles.

We have found that even the smallest of gas bubbles are readily released from a thin sheet of molten glass and release of gas is much more rapid than in the case of agitating the mass of the batch. Accordingly, after reaction is complete in crucible 30 the molten segment glass is slowly poured into crucible 32 and then into crucible 34. Crucibles 32 and 34 may be heated with gas as shown and in general we prefer to maintain the glass at a temperature of 2500° F. to 2800° F. in crucibles 32 and 34.

After the fining operation the molten segment glass is poured into the gravity extrusion feeder 23 which may be made of a suitable refractory material but is preferably made of platinum. The glass is thoroughly mixed in the feeder tank by means of a suitable agitator 38 and agitation is continued until a homogeneous mass of glass of uniform composition is formed. Control of the degassing and mixing operations is readily achieved by taking samples from the batch which are cooled and then examined under a microscope for gas bubbles and striae. The molten glass in the extrusion feeder tank 23 is heated by any convenient means such as the electric resistant element 40 and the temperature is controlled to deposit a self-sustaining gob of segment glass on the countersink surfaces as previously described hereinabove.

In carrying out the process of the present invention it will be understood that the exact conditions of time and temperature employed will vary depending upon the particular composition of the glass at hand and upon the equipment employed in the process. Some examples of conditions employed in connection with particular glass compositions which gave excellent results are as follows.

In this example blank 10 was made of a crown flint type of glass having refractive index $N_D$ of 1.5230 and a reciprocal relative dispersion of 55.1. The raw materials for the glass had the following approximate composition in parts by weight:

| | |
|---|---|
| $SiO_2$ | 45.20 |
| $K_2O$ | 6.34 |
| $Na_2O$ | 1.98 |
| $PbO$ | 45.50 |
| $ZnO$ | 0.80 |
| $As_2O_3$ | 0.17 |

The segment glass which was fused to the countersink surface of the blank was dense barium crown glass having a refractive index $N_D$ of 1.6160 and a reciprocal relative dispersion of 55.1. The raw material for the segment glass had the following approximate composition in parts by weight:

| | |
|---|---|
| $SiO_2$ | 46.86 |
| $K_2O$ | 0.80 |
| $Li_2O$ | 1.90 |
| $K_2O$ | 0.50 |
| CaO | 2.99 |
| PbO | 1.14 |
| BaO | 33.51 |
| MgO | 1.87 |
| ZnO | 3.80 |
| ZrO | 3.39 |
| $Sb_2O_3$ | 1.48 |

The molten segment glass was degassed and mixed to provide a homogeneous mass of uniform composition as described hereinabove. At the time of application of segment glass the surface skin of the blank was at a temperature above the softening point of the glass and the rigid interior core of the blank was below the softening temperature but at a temperature above that at which thermal shock would occur. As determined by optical pyrometer the temperature of the surface skin of the self-sustaining gob of segment glass was 1453° F. at the time the gob was applied to the countersink surface of the blank.

In this example blank 10 was taken from warehouse stock so that the entire body of the blank was at room temperature without temperature gradient and the blank was placed in a furnace (later described) to rapidly heat the blank and provide it with a hot surface skin. The ambient temeprature in the furnace was about 1900° F. and the blank was held in the furnace at this temperature for about two minutes. The blank was then placed on a support block which had been preheated to avoid thermal shock to the glass and the assembly was immediately placed under the segment glass gravity extrusion feeder where a self-sustaining gob of segment glass was deposited on the countersink surface in the manner described in connection with the drawings. At the time of application of the self-sustaining gob of segment glass the surface skin of the blank was above the softening point of the glass and the rigid interior core of the blank was below the softening point but at a temperature above that at which thermal shock would occur. Immediately thereafter positive pressure was applied by means of plunger 27 to spread the self-sustaining gob out into a thin laminate with large surface area. After fusion was complete the blank was annealed and ground and polished and it was found to be of commercial quality.

In another example fused semi-finished lens blanks were successfully made by employing a blank of regular spectacle crown glass having a refractive index $N_D$ of 1.5230 and a reciprocal relative dispersion of 59.5. The raw material for the glass had the following approximate composition in parts by weight:

| | |
|---|---|
| $SiO_2$ | 70.28 |
| $K_2O$ | 9.50 |
| $Na_2O$ | 7.13 |
| CaO | 11.29 |
| $B_2O_3$ | 0.86 |
| $Sb_2O_3$ | 0.94 |

The segment glass was flint glass free of gas bubbles and striae which had a refractive index $N_D$ of 1.6160 and a reciprocal relative dispersion of 36.8. The raw material for the molten segment glass had the following approximate composition in parts by weight:

| | |
|---|---|
| $SiO_2$ | 45.20 |
| $K_2O$ | 6.34 |
| $Na_2O$ | 1.98 |
| PbO | 45.50 |
| ZnO | 0.80 |
| $As_2O_3$ | 0.17 |

At the time of application of the gob of molten segment glass the countersink surface was at about the softening point of the glass blank and the interior core was below the softening point of the glass but above the temperature at which thermal shock would occur. As determined by optical pyrometer the gob of molten segment glass had a sink temperature of about 1500° F. at the time that the gob was applied to the countersink surface. The temperature of the molten segment glass in the extrusion feeder tank was about 2200° F.

The blanks, taken from warehouse stock at room temperature, were placed in a furnace having an ambient temperature of about 1700° F. and the blanks were held in the furnace for about two minutes to rapidly heat the blank and supply it with a hot surface skin.

In this example the method of applying the self-sustaining gob of segment glass to the countersink and pressing it out in the form of a wafer or laminate to cover the countersink surface was the same as described in connection with the previous example.

Figure 16:
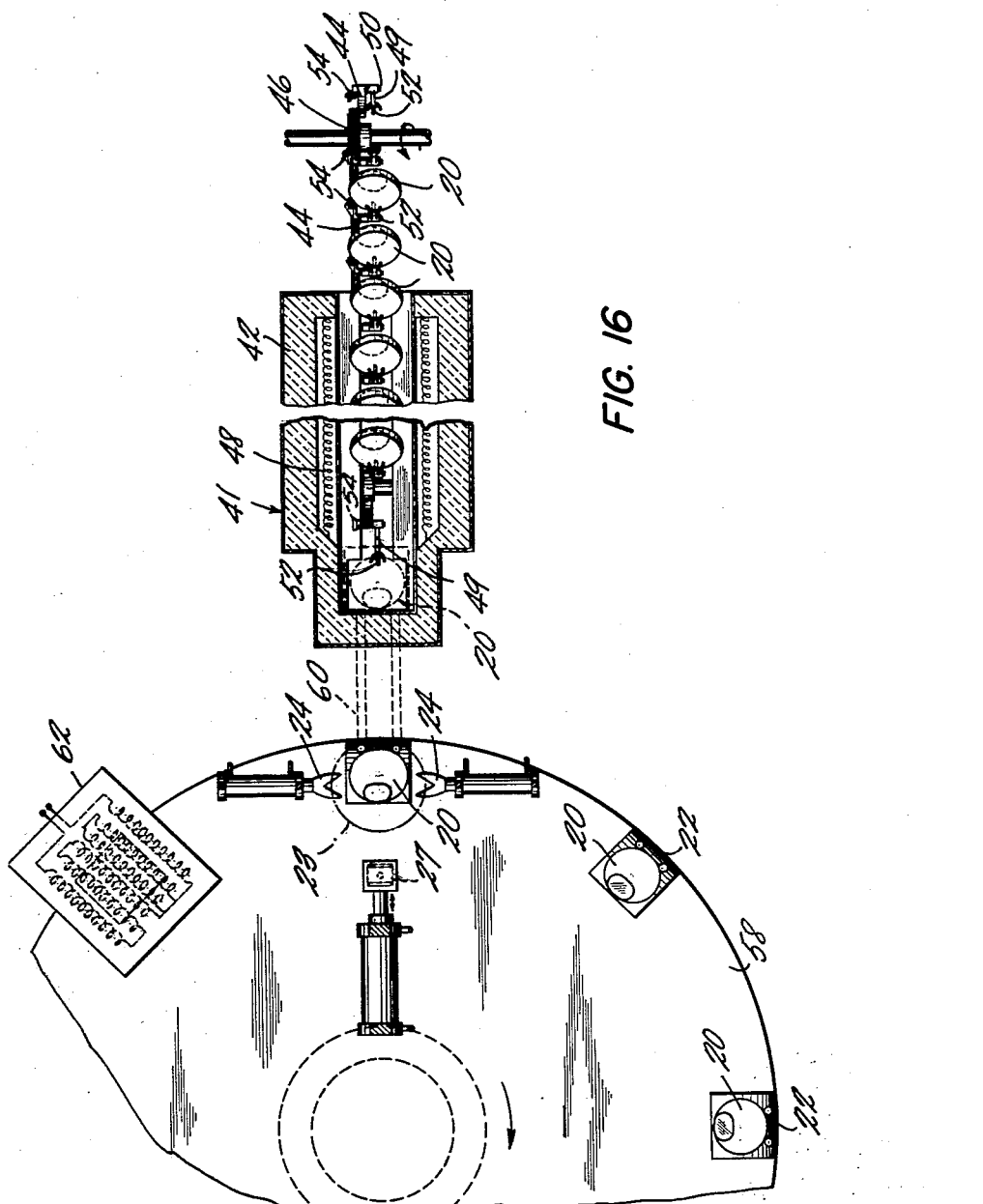
FIG. 16 is a plan view taken on lines 16—16 of FIG. 14.

In the examples the glass blanks 20 were heated in the apparatus illustrated in FIGS. 14 through 16. As there shown blanks 20 were heated in a furnace 41 which includes an insulated cylindrical shell 42 open at the bottom so that supports 44 for the blanks carried by an endless chain belt 46 may move the blanks through the furnace. The furnace is preferably electrically heated as by the coils 48 which maintain an ambient temperature in the furnace above the softening point of the blanks. The blanks are held in the furnace for about two to five minutes.

The support 44 for the blank is in the form of a rod 49 pivoted as at 50 and each support rod carries a clip 52 which engages the periphery of the blank to hold it in the upright position shown in the drawings. In the form of apparatus shown the blanks are held at an acute angle with a vertical plane through the furnace with the countersink surface 21 positioned on the under surface at the top of the blank facing the horizon so that dirt particles will not settle out on the surface of the countersink. Each of the support rods 49 is provided with a cam follower 54 (FIG. 15) which at the end of the furnace tunnel enters the slot of a cam 56 to rotate the rod and position the blank on a refractory support block 22 with the countersink surface in an exposed position ready to receive the gob of segment glass. Once the blank is positioned on the support block the clip 52 is free to slide clear of the blank.

The support blocks 22 are preheated to avoid thermal shock to the blank and for this purpose a rotating table 58 is provided with a plurality of reciprocating supports 60 upon which the blank is mounted. The table 58 is adapted to rotate the refractory support blocks into position under the gravity extrusion feeder tank 23 and the blocks are heated in an electric furnace 62 before they are moved into position under the feeder tank. When the blank is brought into stationary position under the feeder tank the reciprocating support for the block is engaged by the rod of a piston in air cylinder 64 which is adapted to move the support 60 and its block into furnace 41 to receive a glass blank 20 and carry the assembly back into position under the orifice of the gravity extrusion feeder. After a gob 25 of segment glass is deposited on the countersink of the blank plunger 27 is moved into position over the countersink and positive pressure is applied to flatten the gob out and spread it over the countersink in the form of a wafer as previously described. Suitable synchronizing devices (not shown) are employed to make the process continuous.

This application is a continuation in part of application Serial Number 472,004, filed November 30, 1954, and now abandoned, and of application Serial Number 697,896, filed November 21, 1957, and now abandoned.

It will be understood that it is intended to cover all changes and modifications of the preferred embodiment of the invention herein chosen for the purpose of illustration which do not constitute departures from the spirit and scope of the invention.

What I claim is:

1. In the manufacture of multifocal lens blanks by depositing molten segment glass on the countersink surface of a blank to cause fusion of the two glasses, the method which comprises the steps of heating raw materials of a segment glass composition to cause reaction and produce molten segment glass, forming a gob of the molten segment glass and controlling the temperature of the surface layer of the gob so that the gob becomes self-sustaining and tends to retain its shape, depositing the self-sustaining gob of segment glass on the countersink surface of a blank of glass the mass of such self-sustaining gob of segment glass being less than the mass of the blank and then while the self-sustaining gob of glass is still moldable applying pressure to the self-sustaining gob to spread it out over the countersink surface.

2. The method specified in claim 1 which includes the step of forming a self-sustaining gob of segment glass having a mass not more than about one-third the mass of the glass blank.

3. The method specified in claim 1 which includes the steps of controlling the mass of the self-sustaining gob so that it will cover only a portion of the countersink surface and then applying such self-sustaining gob to a portion of the countersink surface.

4. The method specified in claim 1 which includes the step of controlling the application of the gob to the blank so that one side of the gob first contacts the blank adjacent the periphery of said surface and then causing the remainder of the gob to fall across said surface.

5. The method specified in claim 1 which includes the step of applying pressure by means of a heat conducting plunger to accelerate cooling of the segment glass.

6. The method specified in claim 1 which includes the step of preheating the blank to a temperature above that at which thermal shock occurs and thereafter applying the self-sustaining gob to the preheated blank.

7. The method specified in claim 1 which includes the step of preheating the blank to provide such blank with interior core below the softening point of glass but above the temperature at which thermal shock occurs and thereafter applying the self-sustaining gob to the preheated blank.

8. In the manufacture of multifocal lens blanks by depositing molten segment glass on the countersink surface of a preheated blank held by a support to cause fusion of the two glasses, the method which comprises the steps of heating the ingredients of a segment glass composition to cause reaction and produce molten segment glass, heating the blank to bring its temperature above the point of thermal shock, flowing a stream of molten segment glass into a cool atmosphere to form a surface layer of viscous material on the stream which contains the molten core and tends to preserve the extruded shape of the stream, cutting a gob of glass from the stream of mass less than that of the blank for which it is intended, causing the gob to drop through space onto a portion of the countersink surface where the surface layer of viscous material is effective to prevent the gob from spreading out of its own accord to cover the entire countersink surface and then while the segment glass is still moldable applying pressure to the gob to spread it out to cover the entire countersink surface so that heat is distributed through the resulting relatively large surface area of the segment glass to cause fusion and release of the heat of fusion to the atmosphere.

9. The method specified in claim 8 which includes the steps of forming a gob of glass in the general form of a cylinder, and then tilting the gob and thereafter depositing it on the countersink surface so that the side of the cylinder at one end portion thereof will make first contact with the countersink surface.

10. In the manufacture of multifocal lens blanks by depositing molten segment glass on the polished countersink surface of a blank held by a support to cause fusion of the two glasses, the method which comprises the steps of forming a gob of segment glass of uniform composition free of gas bubbles and controlling the temperature of the surface layer of the gob so that the gob becomes self-sustaining and tends to retain its shape, applying the self-sustaining gob of segment glass to a portion of the countersink surface of a blank which is at a temperature above that of thermal shock the mass of such self-sustaining gob of segment glass being less than the mass of the blank and then applying pressure to the self-sustaining gob to cause it to spread out to cover the entire countersink area to cause fusion of the two glasses and release of heat to the atmosphere from the relatively large surface area of the segment glass.

11. In the method of making multifocal lens blanks by depositing molten segment glass upon a polished countersink surface of a preheated countersink blank, the improvement comprising preheating the countersink blank while maintaining it in a generally vertical position with its countersink surface facing the horizon, whereby the tendency for atmospherically borne dust particles to fall upon the countersink surface during its preheating is substantially eliminated and the countersink surface remains clean and relatively free of dust particles, thereafter reorienting the countersink blank to bring its countersink surface into position for receiving the motlen segment glass, forming a gob of the molten segment glass and controlling the temperature of the surface of the gob so that the gob becomes self-sustaining and tends to retain its shape, depositing the self-sustaining gob of segment glass upon the countersink blank so reoriented and then while the self-sustaining gob of segment glass is still moldable applying pressure to the gob to spread it out over the countersink surface.

12. In the method of making multifocal lens blanks by depositing molten segment glass upon a polished countersink surface of a preheated countersink blank, the improvement comprising preheating the countersink blank while maintaining it in a generally vertical position with its countersink surface held in a protected position under the glass of the blank whereby the tendency for atmospherically borne dust particles to fall upon the countersink surface during its preheating is substantially eliminated and the countersink surface remains clean and relatively free of dust particles, thereafter turning the countersink blank to a generally horizontal position with its countersink surface facing upwardly, forming a gob of the molten segment glass and controlling the temperature of the surface of the gob so that the gob becomes self-sustaining and tends to retain its shape, depositing the self-sustaining gob of segment glass upon the upwardly facing countersink surface and then while the self-sustaining gob of segment glass is still moldable applying pressure to the gob to spread it out over the countersink surface.

References Cited in the file of this patent

UNITED STATES PATENTS

| | | |
|---|---|---|
| 869,938 | Schwinzer | Nov. 5, 1907 |
| 930,826 | Bausch | Aug. 10, 1909 |
| 1,165,978 | Kinnear | Dec. 28, 1915 |
| 1,986,575 | Honiss | Jan. 1, 1935 |
| 2,025,086 | Black | Dec. 24, 1935 |
| 2,039,927 | Poglein | May 5, 1936 |
| 2,147,914 | Morehead | Feb. 21, 1939 |
| 2,343,490 | White | Mar. 7, 1944 |
| 2,411,031 | Deyrup | Nov. 12, 1946 |

(Other references on following page)

| | UNITED STATES PATENTS | |
|---|---|---|
| 2,433,013 | Ziegler | Dec. 23, 1947 |
| 2,569,459 | DeVoe | Oct. 2, 1951 |
| 2,640,299 | Sheard et al. | June 2, 1953 |
| 2,734,315 | Poundstone | Feb. 14, 1956 |
| 2,744,034 | Dalton | May 1, 1956 |
| 2,831,664 | Spremulli | Apr. 22, 1958 |
| 2,881,563 | Upton et al. | Apr. 14, 1959 |
| 2,958,162 | Upton | Nov. 1, 1960 |
| 2,992,518 | Silverberg | July 18, 1961 |

| | FOREIGN PATENTS | |
|---|---|---|
| 279,322 | Great Britain | Oct. 27, 1927 |
| 530,152 | Germany | July 22, 1931 |
| 525,925 | Belgium | July 22, 1954 |
| 739,341 | Great Britain | Oct. 26, 1955 |

OTHER REFERENCES

Handbook of Glass Manufacture, by Tooley, published in 1953 by Ogden publishing Company, 55 West 42nd St., New York 36, N.Y. Pages 320, 321, 234. Available in Div. 91, U.S.P.O.